(12) United States Patent
Kirihara et al.

(10) Patent No.: US 7,992,899 B2
(45) Date of Patent: Aug. 9, 2011

(54) STEERING DEVICE FOR VEHICLE (75) Inventors: Kenichi Kirihara, Saitama (JP);
Takahiro Kawakami, Saitama (JP);
Akira Mitsunaga, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 111 days.

(21) Appl. No.: 11/519,234

(22) Filed: Sep. 12, 2006

(65) Prior Publication Data
US 2007/0069513 A1  Mar. 29, 2007

(30) Foreign Application Priority Data

Sep. 15, 2005  (JP) ................ 2005-267941

(51) Int. Cl.
*B62D 1/18* (2006.01)
(52) U.S. Cl. ........................................ 280/775
(58) Field of Classification Search ............ 74/492, 74/493; 280/775, 777
See application file for complete search history.

(56) References Cited

U.S. PATENT DOCUMENTS

| | | | | |
|---|---|---|---|---|
| 4,833,936 A * | 5/1989 | Mariani et al. | ........ | 74/493 |
| 5,876,065 A * | 3/1999 | Ogura et al. | ........ | 280/777 |
| 6,099,036 A * | 8/2000 | Fujiu et al. | ........ | 280/777 |
| 6,189,405 B1 * | 2/2001 | Yazane | ........ | 74/493 |
| 6,357,317 B1 * | 3/2002 | Livengood et al. | ........ | 74/493 |
| 6,474,189 B1 * | 11/2002 | Koellisch et al. | ........ | 74/493 |
| 7,416,199 B2 * | 8/2008 | Yamada | ........ | 280/93.502 |
| 2002/0140219 A1 * | 10/2002 | Tsunoda et al. | ........ | 280/779 |
| 2003/0164608 A1 * | 9/2003 | Morita et al. | ........ | 280/775 |
| 2003/0209102 A1 * | 11/2003 | Murakami et al. | ........ | 74/493 |
| 2005/0104354 A1 * | 5/2005 | Yamada et al. | ........ | 280/775 |
| 2005/0151361 A1 * | 7/2005 | Hori et al. | ........ | 280/775 |
| 2005/0257639 A1 * | 11/2005 | Yamada | ........ | 74/493 |
| 2006/0028010 A1 * | 2/2006 | Yamada | ........ | 280/775 |
| 2006/0039747 A1 * | 2/2006 | Shoda et al. | ........ | 403/109.1 |
| 2006/0082120 A1 * | 4/2006 | Taniguchi et al. | ........ | 280/777 |
| 2006/0162989 A1 * | 7/2006 | Yamada | ........ | 180/444 |

FOREIGN PATENT DOCUMENTS

| | | |
|---|---|---|
| EP | 1 500 832 A | 1/2005 |
| EP | 1 593 581 A | 11/2005 |
| JP | 48-14729 B | 2/1973 |
| JP | 2005-22450 A | 1/2005 |
| JP | 2006-192965 A | 7/2006 |
| JP | 2006192965 A * | 7/2006 |

\* cited by examiner

*Primary Examiner* — Paul N Dickson
*Assistant Examiner* — Robert A Coker
(74) *Attorney, Agent, or Firm* — Arent Fox, LLP (57) ABSTRACT

A steering wheel and a steering gear box are connected to each other via a steering shaft, a first universal joint, an intermediate shaft, a second universal joint and a pinion shaft. A steering column is fixed to a vehicle body via a telescopic mechanism to be adjustable in a forward/rearward position. When the steering shaft moves forward, the telescopic mechanism guides it so that its front end moves downward. Therefore, even when the steering shaft moves forward, an angle θ1 at which the intermediate shaft inclines downward forward with respect to the steering shaft, and an angle θ2 at which the pinion shaft inclines downward forward with respect to the intermediate shaft substantially coincide with each other, thereby securing constant velocity of the steering shaft and the pinion shaft.

5 Claims, 7 Drawing Sheets

FIG. 4A EMBODIMENT
ON FORWARD MOVEMENT OF STEERING WHEEL

FIG. 4B EMBODIMENT
ON BACKWARD MOVEMENT OF STEERING WHEEL

FIG. 8A PRIOR ART
ON FORWARD MOVEMENT OF STEERING WHEEL

FIG. 8B PRIOR ART
ON BACKWARD MOVEMENT OF STEERING WHEEL

STEERING DEVICE FOR VEHICLE

RELATED APPLICATION DATA

The present invention is based upon Japanese priority application No. 2005-267941, which is hereby incorporated in its entirety herein by reference.

BACKGROUND OF THE INVENTION

1. Field of the Invention

The present invention relates to a steering device for a vehicle capable of adjusting a forward/rearward position of a steering wheel in accordance with a physical constitution of a driver.

2. Description of the Related Art

Japanese Patent Application Laid-open No. 2005-22450 discloses a steering device for a vehicle in which a steering wheel and a steering gear box are connected to each other via a steering shaft, a first universal joint, an intermediate shaft, a second universal joint and a pinion shaft, and a forward/rearward position of the steering wheel can be adjusted by constructing the intermediate shaft to be expandable and contractible and by supporting a steering column rotatably supporting the steering shaft at a vehicle body so as to be movable back and forth.

Figure 8A:
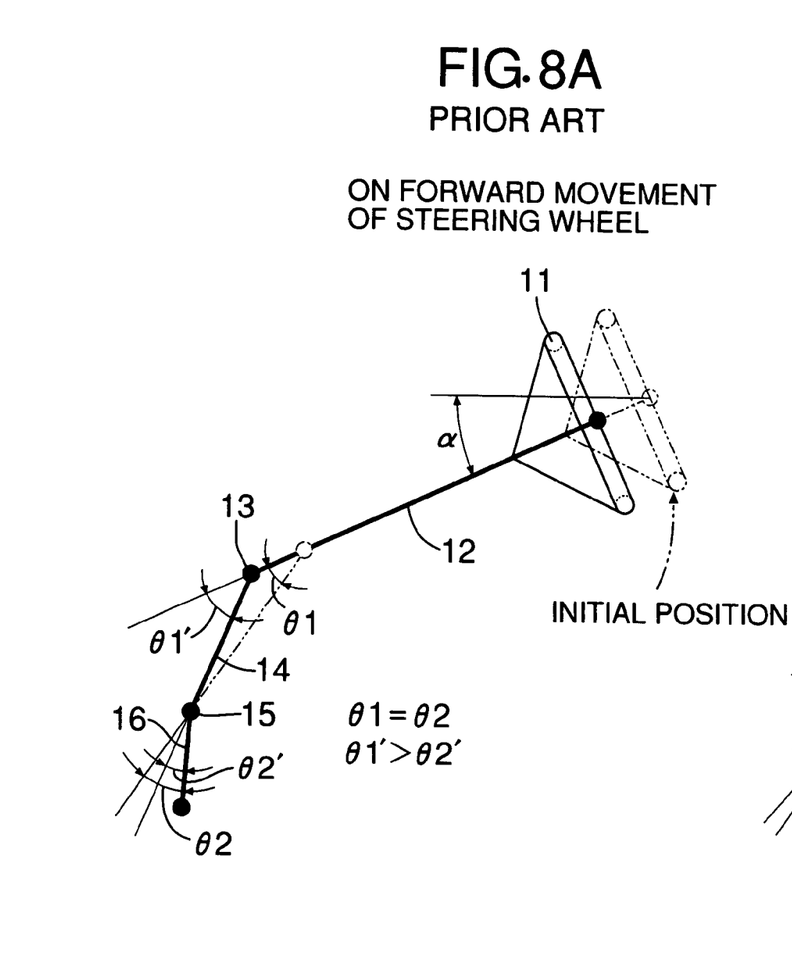
FIG. 8A is a view for explaining the operation of the prior art (on forward movement of the steering wheel).
Figure 8B:
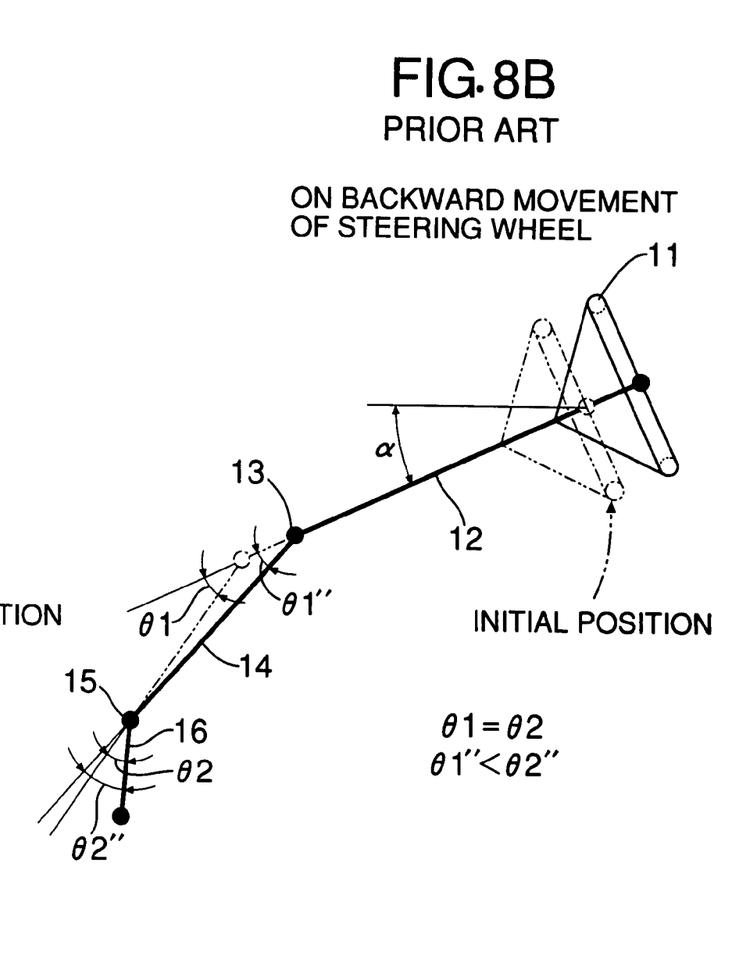
FIG. 8B is a view for explaining the operation of the prior art (on backward movement of the steering wheel).

As shown in FIGS. 8A and 8B, in the conventional steering device for a vehicle, a steering wheel 11 is connected to a steering gear box via a steering shaft 12, a first universal joint 13, an intermediate shaft 14, a second universal joint 15 and a pinion shaft 16. Since the first and second universal joints 13 and 15 are constructed by non-constant velocity joints, the angular velocity of the steering shaft 12 and the angular velocity of the intermediate shaft 14 do not coincide with each other, and the angular velocity of the intermediate shaft 14 and the angular velocity of the pinion shaft 16 do not correspond to each other. Therefore, even if the steering shaft 12 (steering wheel 11) is rotated at a certain angular velocity, the pinion shaft 16 does not rotate at the certain angular velocity.

In order to rotate the steering shaft 12 and the pinion shaft 16 at equal angular velocity, the phase of a cross pin of the first universal joint 13 at a rear end of the intermediate shaft 14 and the phase of a cross pin of the second universal joint 15 at a front end of the intermediate shaft 14 are displaced by 90° from each other, and an inclination angle $\theta 1$ of the intermediate shaft 14 downward forward with respect to a forward extension line of the steering shaft 12, and an inclination angle $\theta 2$ of the pinion shaft 16 downward forward with respect to a forward extension line of the intermediate shaft 14 are made equal. This is because this arrangement cancels non-constant velocity of the first universal joint 13 and non-constant velocity of the second universal joint 15, and causes the steering shaft 12 and the pinion shaft 16 to rotate at the same angular velocity.

As shown by the chain lines in FIGS. 8A and 8B, even when the inclination angle $\theta 1$ of the intermediate shaft 14 downward forward with respect to the forward extension line of the steering 12, and the inclination angle $\theta 2$ of the pinion shaft 16 downward forward with respect to the forward extension line of the intermediate shaft 14 are set to be equal, if the intermediate shaft 14 is constructed to be expandable and contractible, and the steering shaft 12 is made adjustable in the forward/rearward position together with the steering wheel 11, the two inclination angles $\theta 1'$ and $\theta 2'$ ($\theta 1''$ and $\theta 2''$) do not coincide with each other with the forward/rearward movement of the steering shaft 12 as shown by the solid lines in FIGS. 8A and 8B, leading to a problem of losing constant velocity of the steering shaft 12 and the pinion shaft 16.

SUMMARY OF THE INVENTION

The present invention has been achieved in view of the above described circumstances, and has an object to secure constant velocity of a steering shaft and a pinion shaft by making a forward/rearward position of a steering wheel adjustable.

In order to achieve the above object, according to a first feature of the present invention, there is provided a steering device for a vehicle, comprising: a steering shaft which is connected to a steering wheel; an expandable and contractible intermediate shaft which is connected to the steering shaft via a first universal joint; a pinion shaft which is connected to the intermediate shaft via a second universal joint to operate a steering gear box; and a steering column which rotatably supports the steering shaft and is fixed to a vehicle body via a telescopic mechanism to be adjustable in a forward/rearward position, the intermediate shaft inclining downward forward with respect to a forward extension line FEL of the steering shaft, and the pinion shaft inclining downward forward with respect to a forward extension line of the intermediate shaft, wherein when the steering shaft moves forward, the telescopic mechanism guides the steering shaft so that its front end moves downward.

With this arrangement, in the steering device for a vehicle in which the steering wheel and the steering gear box are connected to each other via the steering shaft, the first universal joint, the intermediate shaft, the second universal joint and the pinion shaft, and the steering column which rotatably supports the steering shaft is fixed to the vehicle body to be adjustable in the forward/rearward position via the telescopic mechanism, the telescopic mechanism guides the steering shaft so that its front end moves downward when the steering shaft moves forward. Therefore, even when the steering shaft moves forward, the angle at which the intermediate shaft inclines downward forward with respect to the forward extension line FEL of the steering shaft, and the angle at which the pinion shaft inclines downward forward with respect to the forward extension line of the intermediate shaft are caused to substantially coincide with each other, thereby securing constant velocity of the steering shaft and pinion shaft.

According to a second feature of the present invention, in addition to the first feature, the telescopic mechanism has a guide pin provided on one side of the vehicle body and the steering column; and a long hole which is provided on the other side of the vehicle body and the steering column and in which the guide pin slidably engages.

With this arrangement, the telescopic mechanism is constructed by the guide pin provided on one side of the vehicle body and the steering column, and the long hole which is provided on the other side of the vehicle body and the steering column and in which the guide pin slidably engages, thereby supporting the steering column at the vehicle body to be movable back and forth with the simple structure.

According to a third feature of the present invention, in addition to the second feature, the telescopic mechanism has a first guide pin on a front side of the vehicle body and a second guide pin on a rear side of the vehicle body; and an angle of the long hole in which the first guide pin slidably engages and an angle of the long hole in which the second guide pin slidably engages are different from each other.

With this arrangement, the angle of the long hole in which the guide pin on the front side of the vehicle body slidably engages and the angle of the long hole in which the guide pin on the rear side of the vehicle body slidably engages are different from each other, thereby changing the angle of the steering shaft as desired by only moving the steering column in the forward/rearward direction.

The first and second guide pins 27 and 28 of embodiments correspond to the first and second guide pins of the present invention.

The above-mentioned object, other object, characteristics, and advantages of the present invention will become apparent from preferred embodiments, which will be described in detail below by reference to the attached drawings.

BRIEF DESCRIPTION OF THE DRAWINGS

FIGS. 1 to 4B show a first embodiment of the present invention.

DESCRIPTION OF THE PREFERRED EMBODIMENTS

A first embodiment of the present invention will now be described based on FIGS. 1 to 4B.

Figure 1:
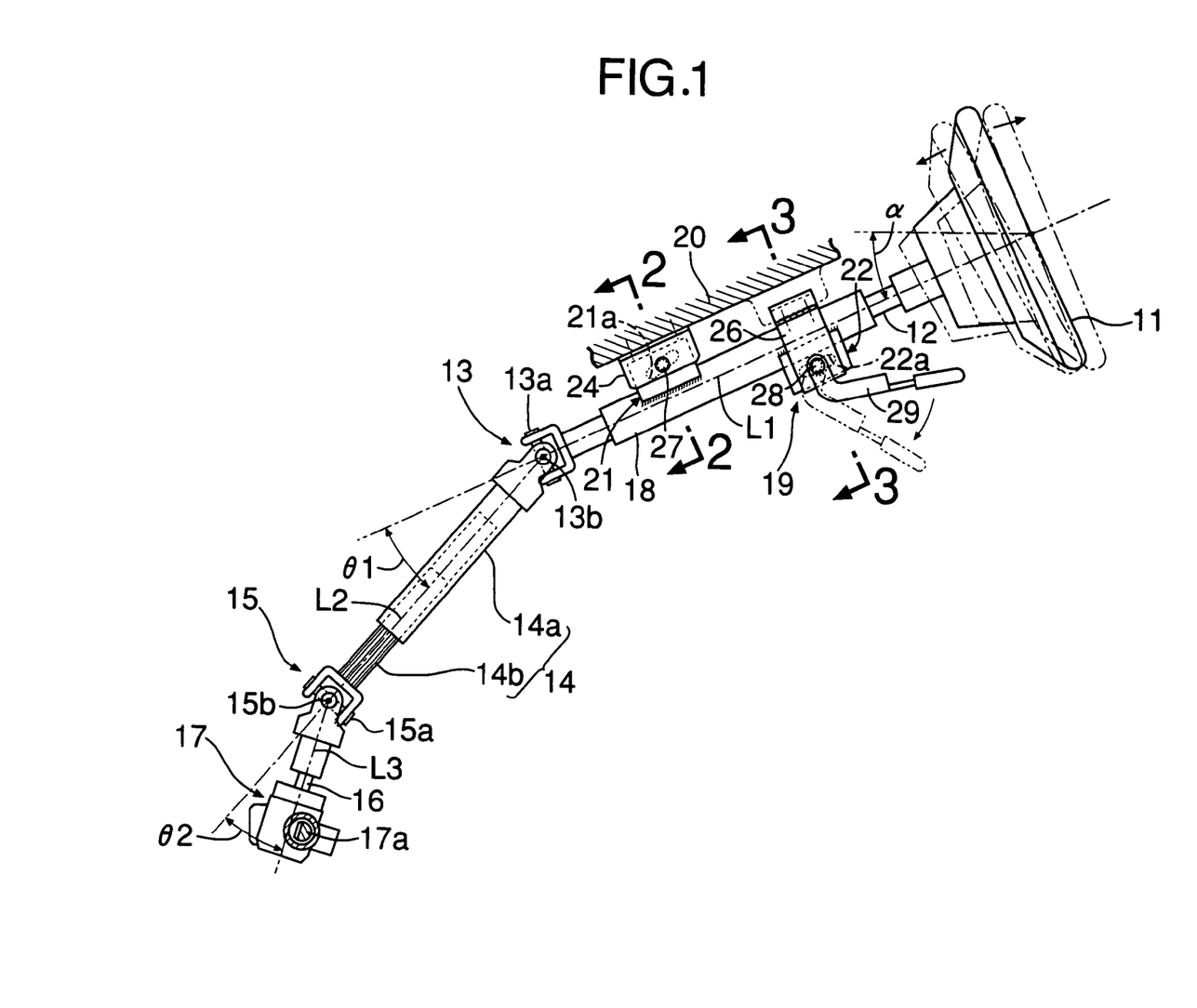
FIG. 1 is a side view of a steering device including a telescopic mechanism.

As shown in FIG. 1, a steering shaft 12 is connected to a steering wheel 11 operated by a driver and extends downward forward. A front end of the steering shaft 12 is connected to a rear end of an intermediate shaft 14 via a first universal joint 13. The intermediate shaft 14 comprises a rear intermediate shaft 14a and a front intermediate shaft 14b which are spline-coupled to each other so that the intermediate shaft 14 is expandable and contractible. An axial line L2 of the intermediate shaft 14 inclines downward forward by an angle θ1 with respect to an axial line L1 of the steering shaft 12. The first universal joint 13 is constructed by pivotably supporting two pins 13a and 13b intersecting each other in a cross shape at the front end of the steering shaft 12 and the rear end of the rear intermediate shaft 14a.

A front end of the intermediate shaft 14 is connected to a rear end of the pinion shaft 16 via a second universal joint 15. A pinion (not shown) which is meshed with a rack 17a inside a rack/pinion type steering gear box 17 is provided at the front end of the pinion shaft 16. An axial line L3 of the pinion shaft 16 inclines downward forward by an angle θ2 with respect to the axial line L2 of the intermediate shaft 14. The second universal joint 15 is constructed by pivotally supporting two pins 15a and 15b intersecting each other in a cross shape at the front end of the intermediate shaft 14 and the rear end of the pinion shaft 16, respectively.

The phase of the first universal joint 13 and the phase of the second universal joint 15 are displaced by 90° from each other. Namely, the pin 13b with which the first universal joint 13 is connected to the rear end of the intermediate shaft 14, and the pin 15a with which the second universal joint 15 is connected forward end of the intermediate shaft 14 are displaced by 90° from each other.

A pipe-shaped steering column 18 which rotatably supports the steering shaft 12 is fixed to a vehicle body 20 via a telescopic mechanism 19 to be adjustable in the forward/rearward position.

Figure 2:
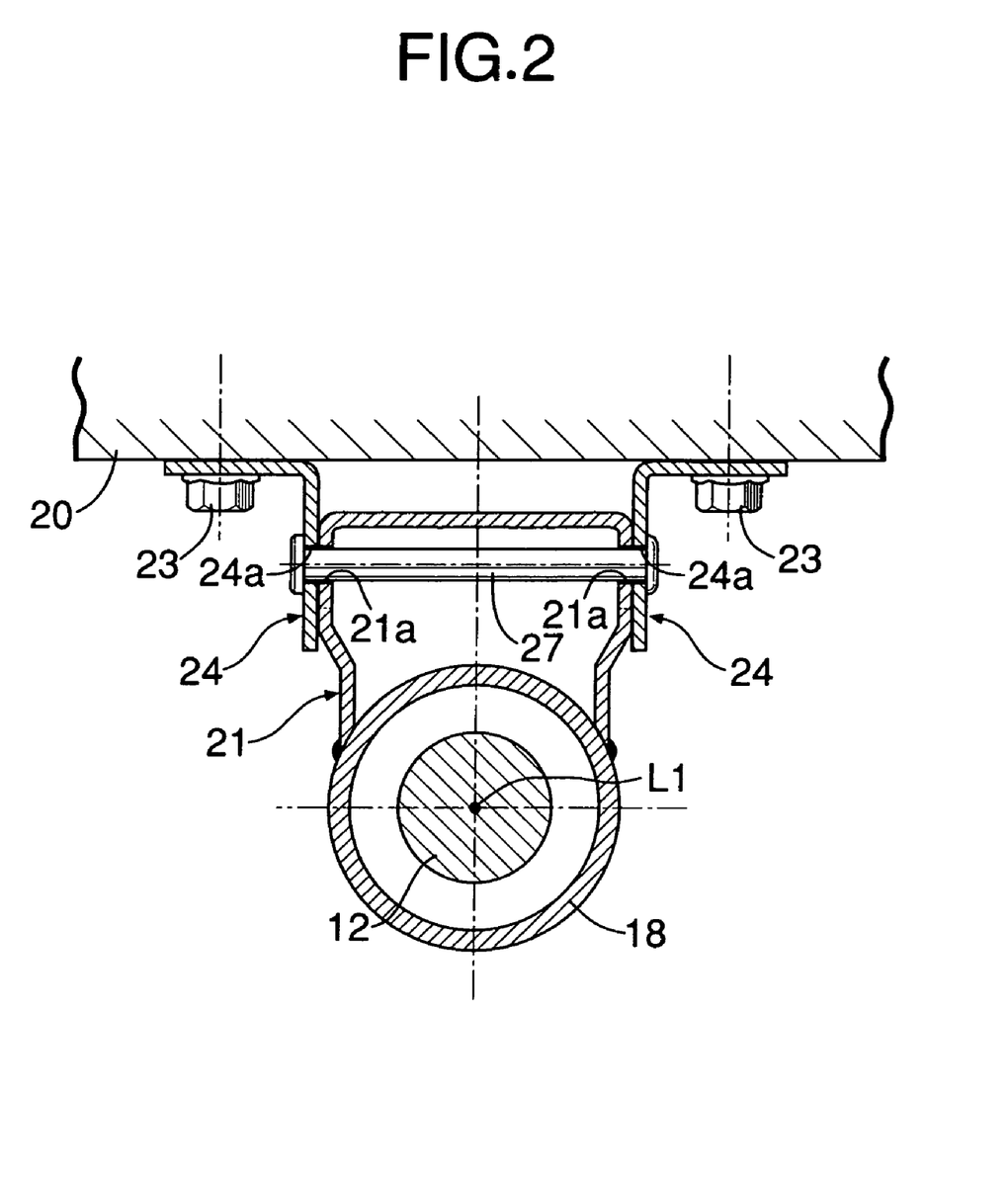
FIG. 2 is an enlarged sectional view taken on line 2-2 in FIG. 1.
Figure 3:
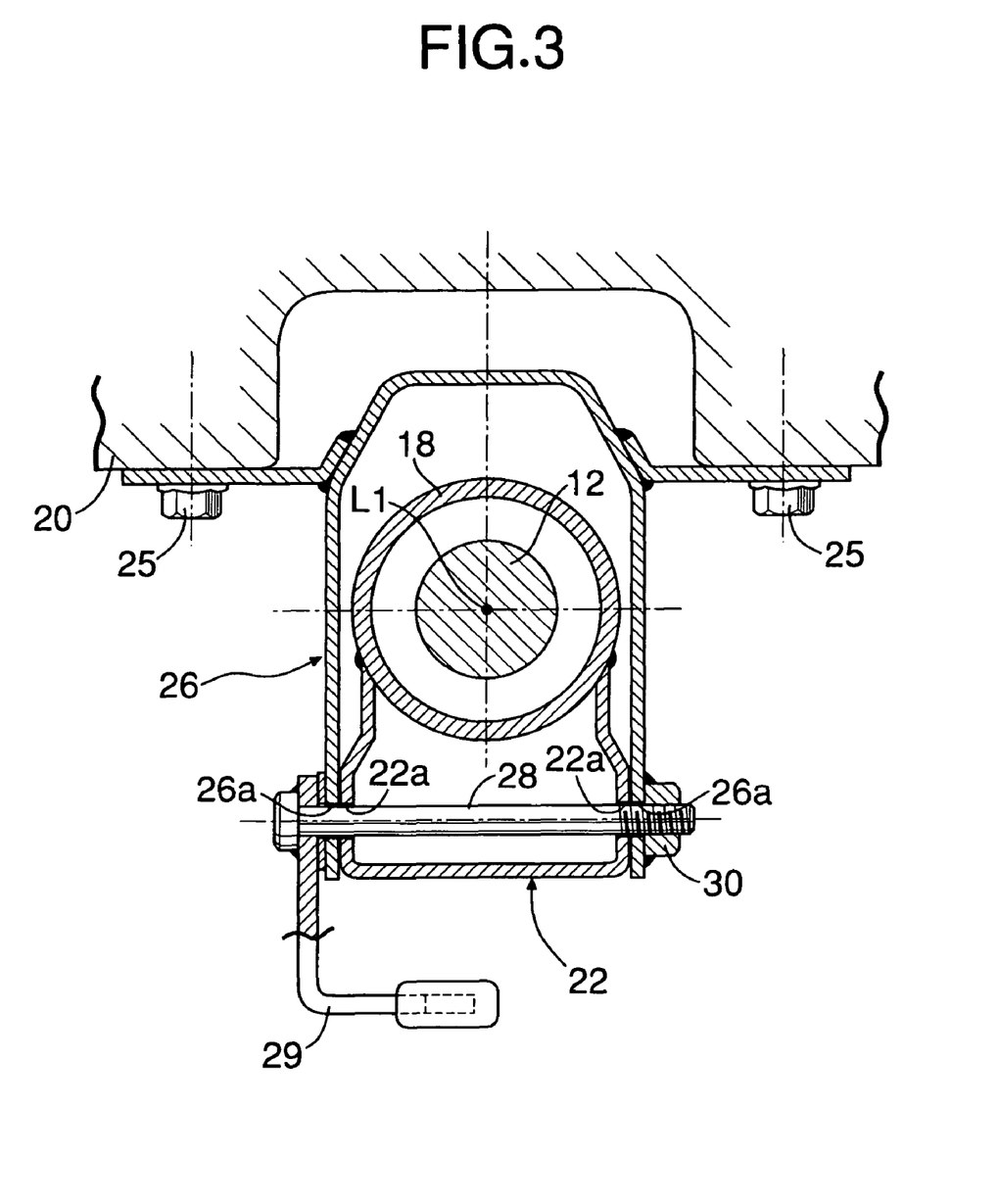
FIG. 3 is an enlarged sectional view taken on line 3-3 in FIG. 1.

As is obvious from FIGS. 1 to 3, the telescopic mechanism 19 includes: a first movable bracket 21 and a second movable bracket 22 which are welded to the steering column 18; first fixing brackets 24 and 24 which are fixed to the vehicle body 20 with bolts 23 and 23 at positions corresponding to the first movable bracket 21; and a second fixing bracket 26 which is fixed to the vehicle body 20 with bolts 25 and 25 at positions corresponding to the second movable bracket 22. Two long holes 21a and 21a are formed in the first movable bracket 21, and a first guide pin 27 whose opposite ends penetrate through round holes 24a and 24a of the first fixing brackets 24 and 24, slidably penetrates through the long holes 21a and 21a.

Tow long holes 22a and 22a are formed in the second movable bracket 22, and a second guide pin 28 whose opposite ends penetrate through round holes 26a and 26a of the second fixing bracket 26, slidably penetrates through the long holes 22a and 22a. A telescopic lever 29 is fixed to one end of the second guide pin 28. A male screw 28a formed at the other end of the second guide pin 28 is threadedly fitted in a nut 30 which is welded to the second fixing bracket 26.

As is obvious from FIG. 1, the long holes 22a and 22a of the second movable bracket 22 on the rear side are parallel with the steering shaft 12, and the long holes 21a and 21a of the first movable bracket 21 on the front side incline downward forward with respect to the steering shaft 12.

Next, an operation of the first embodiment including the above described construction will be described.

When a driver operates the steering wheel 11, turn of the steering wheel 11 is transmitted to the steering gear box 17 via the steering shaft 12, the first universal joint 13, the intermediate shaft 14, the second universal joint 15 and the pinion shaft 16, whereby left and right wheels are steered.

An operation of adjusting the forward/rearward position of the steering wheel 11 corresponding to the physical constitution of the driver is performed as follows. When the telescopic lever 29 is pulled and the second guide pin 28 is rotated to loosen the fastening to the nut 30, the constraint on the second movable bracket 22 to the second fixing bracket 26 is released, and therefore, the second movable bracket 22 can be relatively moved in the forward/rearward direction with respect to the second fixing bracket 26 as the second guide pin 28 is guided by the long holes 22a and 22a. The first movable bracket 21 can relatively move in the forward/rearward direction with respect to the first fixed bracket 24 as the first guide pin 27 is guided by the long grooves 21a and 21a, and therefore, the forward/rearward positions of the steering column 18, the steering shaft 12 and the steering wheel 11 can be adjusted.

When the telescopic lever 29 is then returned and the second guide pin 28 and the nut 30 are fastened, the second movable bracket 22 is constrained with respect to the second fixing bracket 26 by a frictional force, thereby fixing the forward/rearward position of the steering column 18. At this time, the intermediate shaft 14 comprising the rear intermediate shaft 14a and the front intermediate shaft 14b which are spline-coupled to each other, expands and contracts corresponding to the forward/rearward movement of the steering shaft 12 integral with the steering column 18, thereby allowing the forward/rearward movement of the steering shaft 12.

In the prior art, when the steering wheel 11 is caused to move forward, without changing a downward-forward angle α of the steering shaft 12 as shown in FIG. 8A, from the initial position shown by the chain line in FIG. 8A, namely, from the state in which the angle θ1 formed by the steering shaft 12 and the intermediate shaft 14 and the angle θ2 formed by the intermediate shaft 14 and the pinion shaft 16 coincide with each other, the angle θ1 increases to an angle θ1', and the angle θ2 decreases to an angle θ2'. Therefore, the angle θ1' and the angle θ2' do not coincide with each other, and thus constant velocity of the steering shaft 12 and the pinion shaft 16 is lost.

When the steering wheel 11 is moved backward, without changing the downward-forward angle α of the steering shaft 12 as shown in FIG. 8B, from the initial position of θ1=θ2, the angle θ1 decreases to an angle θ1", and the angle θ2 increases to an angle θ2". Therefore, the angle θ1" and the angle θ2" do not coincide with each other, and thus the steering shaft 12 and the pinion shaft 16 lose their constant velocity.

Figure 4A:
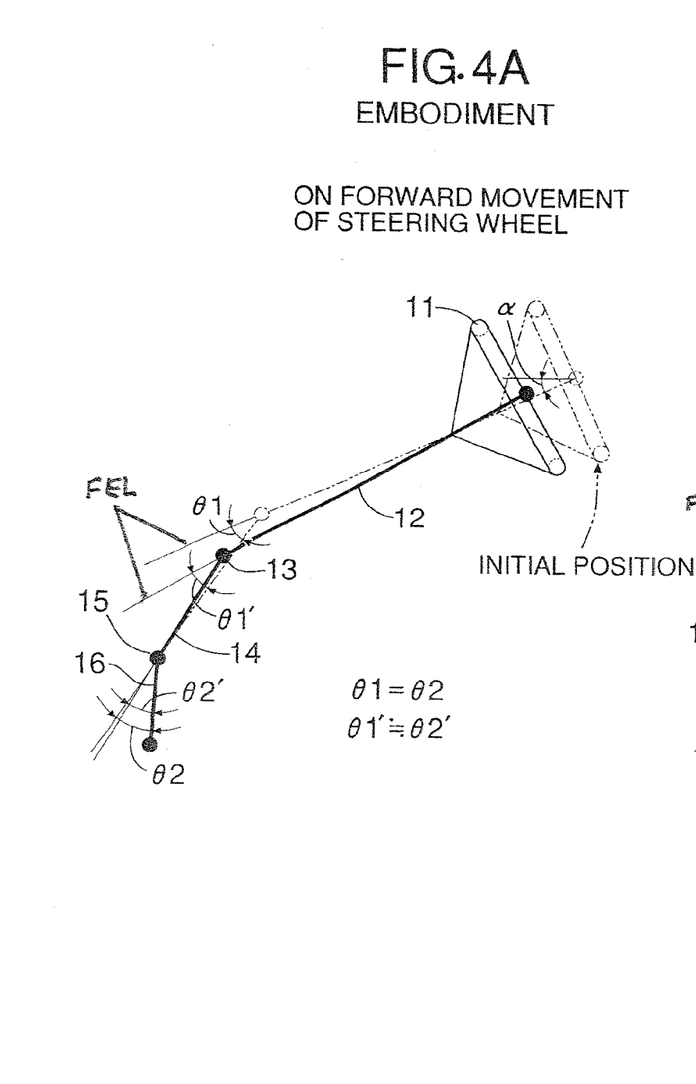
FIG. 4A is a view for explaining the operation of the first embodiment (on forward movement of a steering wheel).

On the other hand, in this embodiment, while the long holes 22a and 22a of the second movable bracket 22 on the rear side are parallel with the steering shaft 12, the long holes 21a and 21a of the first movable bracket 21 on the front side incline downward forward with respect to the steering shaft 12. Therefore, when the steering wheel 11 is moved forward as shown in FIG. 4A, the downward-forward angle α of the steering shaft 12 increases. As a result, the angle θ1 before moving forward and the angle θ1' after moving forward become substantially equal, and the angle θ2 before moving forward and the angle θ2' after moving forward become substantially equal, thereby substantially securing constant velocity of the steering shaft 12 and the pinion shaft 16.

Figure 4B:
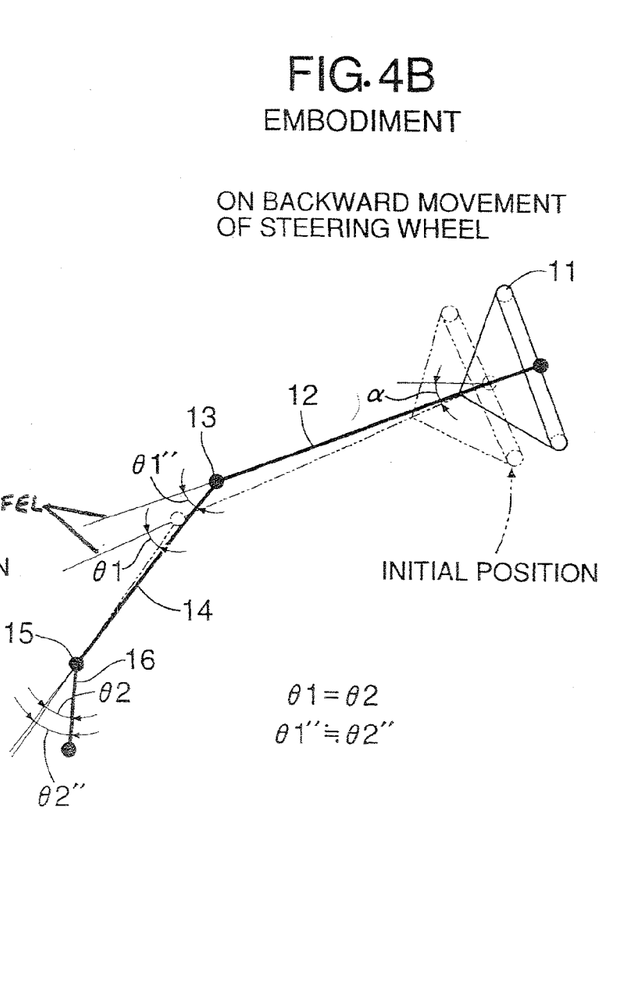
FIG. 4B is a view for explaining the operation of the first embodiment (on backward movement of the steering wheel).

When the steering wheel 11 is moved backward as shown in FIG. 4B, the downward-forward angle α of the steering shaft 12 decreases, so that the angle θ1 before moving forward and the angle θ1" after moving forward become substantially equal, and the angle θ2 before moving forward and the angle θ2" after moving forward become substantially equal, thereby substantially securing constant velocity of the steering shaft 12 and the pinion shaft 16.

Figure 5:
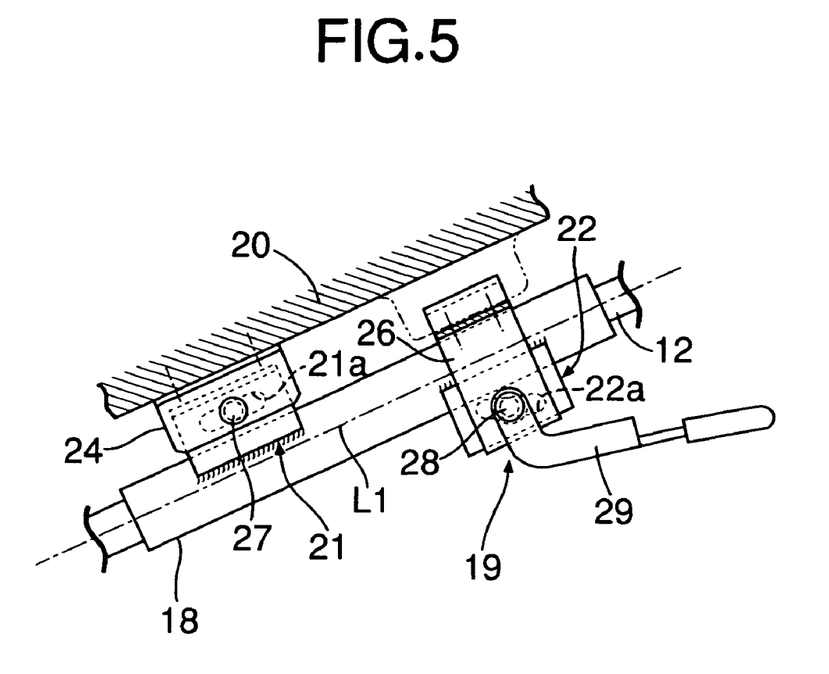
FIG. 5 is a view showing a telescopic mechanism according to a second embodiment.

FIG. 5 shows a second embodiment of the present invention.

In the first embodiment, the long holes 22a and 22a of the second movable bracket 22 on the rear side are made parallel with the steering shaft 12, and the long holes 21a and 21a of the first movable bracket 21 on the front side are inclined downward forward with respect to the steering shaft 12. However, in the second embodiment, the long holes 21a and 21a of the first movable bracket 21 on the front side are made parallel with the steering shaft 12, and the long holes 22a and 22a of the second movable bracket 22 on the rear side are inclined upward forward with respect to the steering shaft 12. According also to the second embodiment, the operational effect as in the first embodiment can be achieved.

Figure 6:
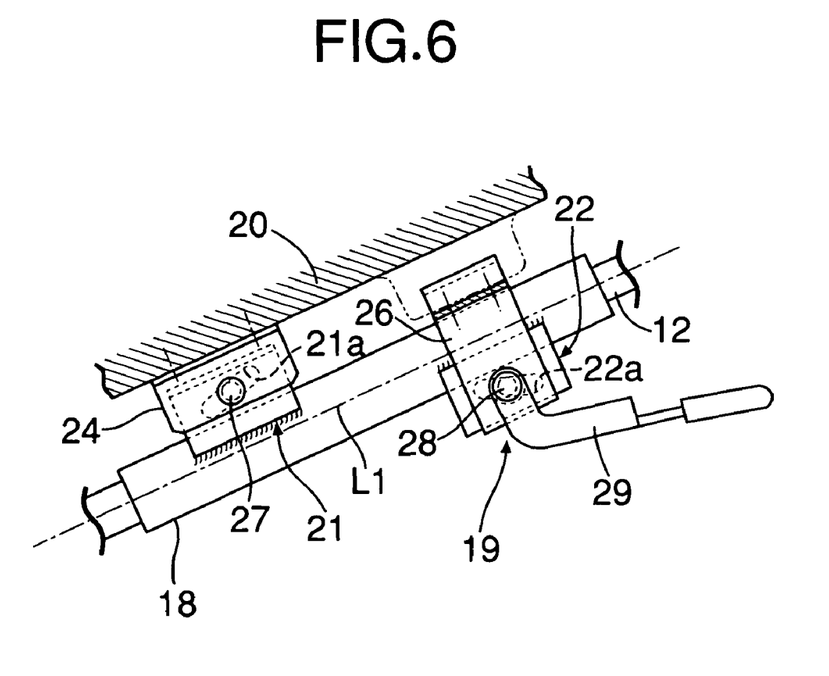
FIG. 6 is a view showing a telescopic mechanism according to a third embodiment.

FIG. 6 shows a third embodiment of the present invention.

In the third embodiment, the long holes 21a and 21a of the first movable bracket 21 on the front side are inclined downward forward with respect to the steering shaft 12, and the long holes 22a and 22a of the second movable bracket 22 on the rear side are inclined upward forward with respect to the steering shaft 12. According also to the third embodiment, the operational effect as in the first embodiment can be achieved.

Figure 7:
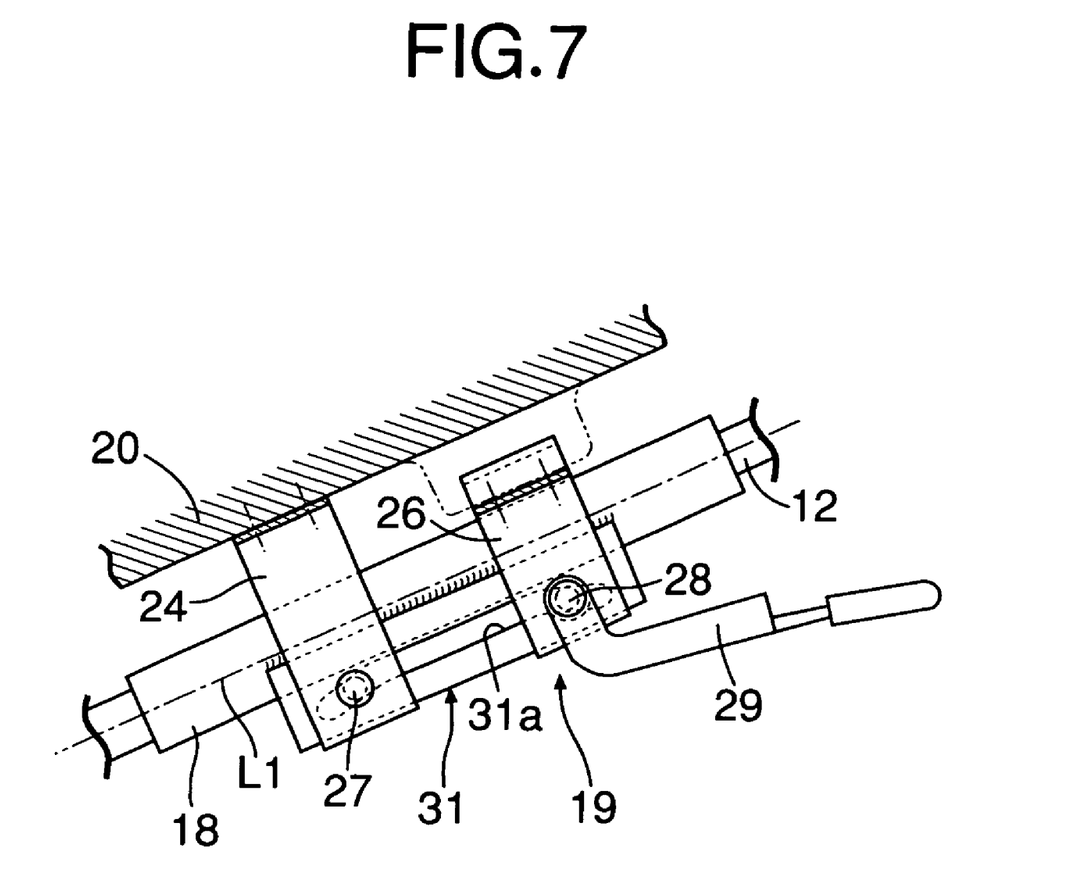
FIG. 7 is a view showing a telescopic mechanism according to a fourth embodiment.

FIG. 7 shows a fourth embodiment of the present invention.

In the fourth embodiment, upwardly-curved arc-shaped long holes 31a and 31a are formed in a single movable bracket 31 fixed to the steering column 18, and first and second guide pins 27 and 28 are slidably engaged in the long holes 31a and 31a. According also to the fourth embodiment, the operational effect as in the first embodiment can be achieved.

The embodiments of the present invention have been described above, and various design changes can be made thereto without departing from the subject matter of the present invention.

For example, in the embodiments, the long holes 21a, 22a and 31a are formed at the movable bracket 21, 22 and 31 side, and the round holes 24a and 26a are formed in the fixed brackets 24 and 26 side, but the positional relationship may be reversed.

What is claimed is:

1. A steering device for a vehicle, comprising:
a steering shaft which is connected to a steering wheel;
an expandable and contractible intermediate shaft which is connected to the steering shaft via a first universal joint;
a pinion shaft which is connected to the intermediate shaft via a second universal joint to operate a steering gear box; and
a steering column which rotatably supports the steering shaft and is operably connected to a vehicle body via a telescopic mechanism to be adjustable in a forward/rearward position,
the intermediate shaft inclining downward forward with respect to a forward extension line of the steering shaft, and the pinion shaft inclining downward forward with respect to a forward extension line of the intermediate shaft,
wherein when the steering shaft moves forward, the telescopic mechanism guides the steering shaft so that its front end moves downward and the first universal joint is positioned below a forward extension line of the steering shaft before the steering shaft moves forward, the telescopic mechanism having a first guide pin and a first oval shaped hole in which the first guide pin slides.

2. The steering device for a vehicle according to claim 1, further comprising a second guide pin and a second oval shaped hole,
the first guide pin being located on a first side of the steering column and the second guide pin being located on a second side of the steering column; and
an angle of the first oval shaped hole in which the first guide pin slides relative to the steering shaft and an angle of the second oval shaped hole in which the second guide pin slides relative to the steering shaft are different from each other.

3. The steering device for a vehicle according to claim 1, further comprising a second guide pin which also slides in the first oval shaped hole, and wherein the first oval shaped hole comprises first and second ends joined to each other by an intermediate section, the first and second ends extending oblique relative to the intermediate section.

4. A steering device for a vehicle, comprising:
a steering shaft which is connected to a steering wheel;
an expandable and contractible intermediate shaft which is connected to the steering shaft via a first universal joint;
a pinion shaft which is connected to the intermediate shaft via a second universal joint to operate a steering gear box; and a steering column which rotatably supports the steering shaft and is operably connected to a vehicle body via a telescopic mechanism to be adjustable in a forward/rearward position, the intermediate shaft inclining downward forward with respect to a forward extension line of the steering shaft, and the pinion shaft inclining downward forward with respect to a forward extension line of the intermediate shaft, wherein when the steering shaft moves forward, the telescopic mechanism guides the steering shaft so that its front end moves downward and has a first guide pin, a first oval shaped hole in which the first guide pin slides, a second guide pin, and a second oval shaped hole in which the second guide pin slides, and wherein the first and second oval shaped holes have longitudinal directions thereof different from each other and one of the first and second oval shaped holes, which is located closer to a vehicle front side than the other one, is arranged to become closer to an axis of the steering column as said one of the first and second oval shaped holes goes to the vehicle front side.

5. A steering device for a vehicle, comprising:

a steering shaft which is connected to a steering wheel;

an expandable and contractible intermediate shaft which is connected to the steering shaft via a first universal joint;

a pinion shaft which is connected to the intermediate shaft via a second universal joint to operate a steering gear box; and a steering column which rotatably supports the steering shaft and is operably connected to a vehicle body via a telescopic mechanism to be adjustable in a forward/rearward position, the intermediate shaft inclining downward forward with respect to a forward extension line of the steering shaft, and the pinion shaft inclining downward forward with respect to a forward extension line of the intermediate shaft, wherein when the steering shaft moves forward, the telescopic mechanism guides the steering shaft so that its front end moves downward and has a first guide pin, a first oval shaped hole in which the first guide pin slides, a second guide pin, and a second oval shaped hole in which the second guide pin slides, and wherein the first and second oval shaped holes have longitudinal directions thereof different from each other and one of the first and second oval shaped holes, which is located closer to a vehicle rear side than the other one, is arranged to become farther away from an axis of the steering column as said one of the first and second oval shaped holes goes to the vehicle rear side.

* * * * *